United States Patent [19]
Kite, III

[11] Patent Number: 5,737,991
[45] Date of Patent: Apr. 14, 1998

[54] WARP BEAD OVEN GASKET

[75] Inventor: J. Sellers Kite, III, Carefree, Ariz.

[73] Assignee: Bentley-Harris Inc., Exton, Pa.

[21] Appl. No.: 621,471

[22] Filed: Mar. 25, 1996

[51] Int. Cl.$^6$ ............................................ D04C 1/00
[52] U.S. Cl. ........................... 87/9; 49/498.1; 81/13; 277/230
[58] Field of Search ........................ 87/6, 7, 9, 13; 49/498.1; 277/230

[56] References Cited

U.S. PATENT DOCUMENTS

| | | | |
|---|---|---|---|
| 1,950,999 | 3/1934 | Sackner | 87/6 |
| 2,121,893 | 6/1938 | Tea | 20/69 |
| 2,268,513 | 12/1941 | Mintel | 87/7 |
| 2,665,458 | 1/1954 | Wilcox | 20/69 |
| 3,578,764 | 5/1971 | Nunnally et al. | 277/230 |
| 3,812,316 | 5/1974 | Milburn | 213/10.55 |
| 4,441,726 | 4/1984 | Uhl | 277/230 |
| 4,512,331 | 4/1985 | Levi | 126/190 |
| 4,538,381 | 9/1985 | Vogel | 49/479 |
| 4,979,280 | 12/1990 | Weil | 29/446 |
| 5,066,028 | 11/1991 | Weil | 49/498.1 |
| 5,395,126 | 3/1995 | Tresslar | 277/166 |

FOREIGN PATENT DOCUMENTS

| | | | |
|---|---|---|---|
| 2491120 | 4/1982 | France | E06B 7/22 |
| 1034013 | 7/1958 | Germany | 87/7 |
| 1543598 | 4/1979 | United Kingdom . | |
| WO 95/21451 | 8/1995 | WIPO | H01B 13/00 |

*Primary Examiner*—William Stryjewski
*Attorney, Agent, or Firm*—Synnestvedt & Lechner

[57] ABSTRACT

A tubular insulating gasket includes a braided jacket having a non-stretchable warp bead laid in along one side wall and a mesh bulb made of resilient wire contained within the jacket and spaced from the warp bead. The gasket is made by braiding the jacket on a tubular mandrel having a diameter greater than the pull-down diameter of the braid, interlocking the warp bead into the braid to prevent its axial expansion, feeding the bulb through the mandrel into the jacket as the jacket is taken off the mandrel. Gaskets have less tendency to crimp or collapse as where the gasket is fit around corners of an open door are produced.

8 Claims, 2 Drawing Sheets

WARP BEAD OVEN GASKET

FIELD OF THE INVENTION

This invention relates to thermal gasket products and, more particularly, to thermal gasket products having a jacket of interlaced thermally resistant yarns and used for sealing spaces, such as the door of an oven of the self-cleaning type. In another of its aspects, the invention involves a method for making such products.

BACKGROUND OF THE INVENTION

Since the introduction of self-cleaning ovens, there has been a continual demand for improved thermal gaskets for sealing an oven door, particularly when the oven is in the self-cleaning cycle where temperatures up to about 800° are encountered. The gaskets employed must be durable, having the capabilities of withstanding continuous exposure to such temperatures over a prolonged period of time, must retain their resilience despite being continually compressed and, finally, must be easily installed and relatively easy and inexpensive to manufacture.

An early example of such a gasket product is found in U.S. Pat. No. 3,578,764. The gasket disclosed in the '764 patent has a braided glass fiber jacket which covers a resilient metal sealing element typically comprised of stainless steel wire and has a tubular mounting bead fitted within the jacket and spaced from the resilient sealing element in parallel relationship thereto. The bead elements are maintained in spaced parallel relationship by means of stitching which extends through the layers of the jacket between the mounting bead and the resilient tubular element. The mounting bead is clamped in place between a pair of panels making up the door and/or by clips in order to maintain the jacketed resilient element in position so that it interfaces with the periphery of the door and an adjacent surface of the oven surrounding the oven chamber.

Although the gaskets disclosed in the '764 patent perform well in practice, the gaskets are somewhat expensive and time consuming to manufacture.

An alternative approach to the manufacture of oven gaskets is found in U.S. Pat. No. 4,822,060. Gaskets of the '060 patent are comprised of a tubular resilient wire member jacketed with a thermally resistant interlaced yarn in a manner similar to the gaskets of the '764 patent. In order to affix this gasket to the periphery of the oven door, a length of wire on which spaced protrusions having an arrowhead-like profile are formed, project through the jacket and interfit with spaced holes in the periphery of the oven door. The gaskets of the '060 patent are expensive to manufacture and require that the surface to which they are to be affixed have apertures which are spaced by distances corresponding to the distances between the protrusions on the wire form. In some applications, it is not practical to provide such apertures and some oven manufacturers have a preference that they not be provided.

Other forms of oven gaskets having attachment means are disclosed in U.S. Patent Nos. 5,205,075, 5,289,658, 5,395,126 and 5,438,852. The gaskets of the latter noted patents are all characterized by the use of clips extending outwardly from the interior of the gasket and interfitting with apertures preformed in the door or other panel on which the gasket is intended to be made.

In the manufacture of braided tubular products used for gaskets and other applications, it is known to provide integrally braided warp elements for the purpose of providing the braid with a particular characteristic. It is known, for example, to provide relatively large warp beads for the purpose of causing a braided insulating material to stand away from a surface that the braid is intended to insulate. It is also known to lay-in elastic warp elements in a braided structure for the purpose of causing the braided structure to be biased to an axially compressed condition, as disclosed, for example, in U.S. Pat. No. 3,315,559 and by laying in limp warp elements to impart body, coverage and improved tensile strength to braided products of monofilament material without sacrificing spring back properties, as disclosed, for example, in U.S. Pat. No. 5,197,370.

SUMMARY AND OBJECTS OF THE INVENTION

In summary, tubular insulating gaskets of the invention comprise a tubular braid of an insulating yarn formed as an outer jacket for a resilient bulb of wire where the bulb is preferably formed by knitting and the tubular braid is preferably formed of glass fiber yarn. According to the invention, a single warp bead or rope of relatively large diameter is introduced from a stationary guide eye so that it lies straight and is interlaced with the braided yarns. In forming the gasket, the braid is braided under tension and backed up and radially expanded by passing it over a mandrel which is of larger diameter than the pull down diameter of the braid. When the braid comes off the mandrel with the warp bead interlocked, the braided jacket is held in the backed up condition, and the side away from the warp bead is free to axially expand or contract. The jacket is manufactured with a diameter which is sufficiently large so as to allow for receipt of the knitted metal bulb and for the appropriate separation of the bulb and the warp bead. The warp bead may vary in size but is of sufficient diameter to allow it to serve as a mounting element which is interengaged and firmly held by spaced clamps which engage around it.

Various advantages of the technique and product just described result in an oven gasket which is simple to make, low in cost and well suited for the purpose. For example, oven gaskets formed according to the invention with a relatively large warp bead locked in place avoid the need for stitching of the jacket between the warp bead and the tubular gasket. Since the warp bead, in effect, locks the braid in backed-up condition along the line the warp extends, the opposite side of the jacket wall readily expands axially when the gasket is passed around the corners where the vertical and horizontal edges of the door intersect. The freedom to expand is an important advantage in that kinking or collapsing of the tubular gasket at the corners of a door or other object is substantially eliminated.

Other objects and advantages of the invention will become apparent upon reference to the following detailed description of the preferred embodiment and from the accompanying drawings.

DETAILED DESCRIPTION OF THE PREFERRED EMBODIMENT

Figure 1:
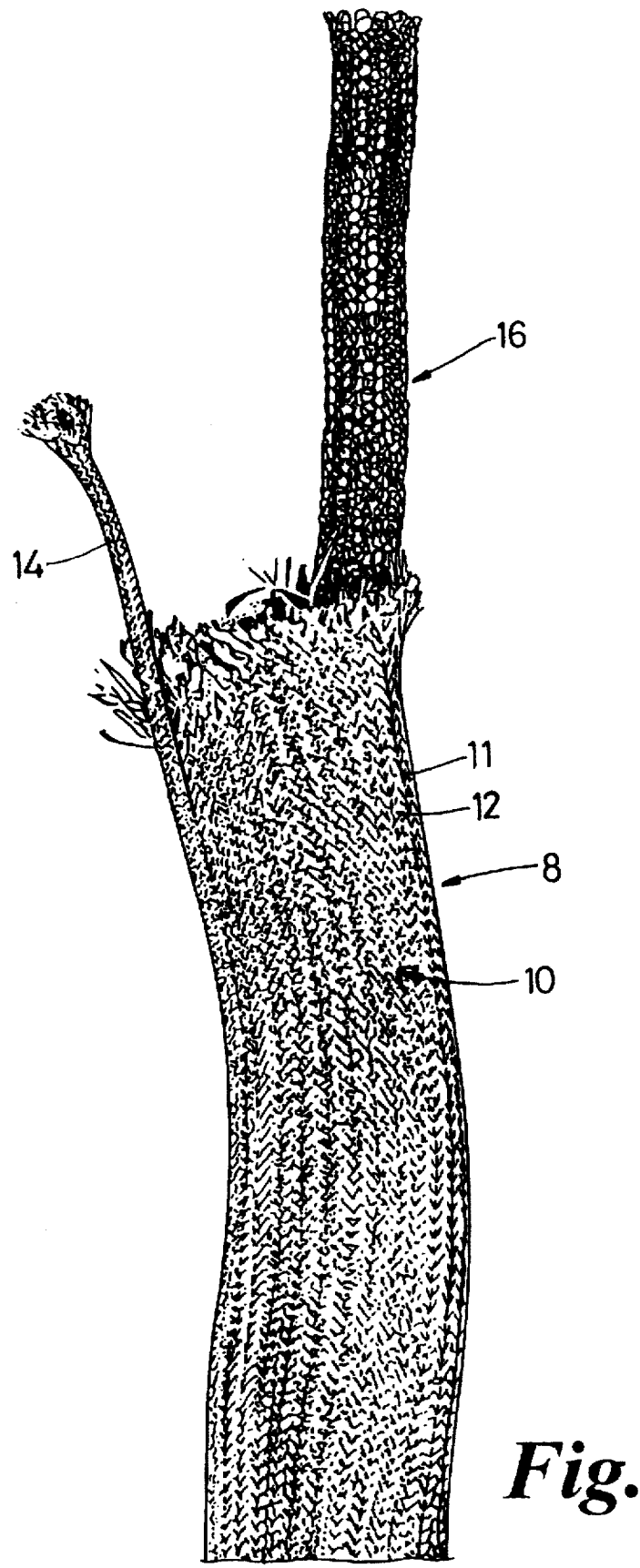
FIG. 1 shows a braided gasket formed according to the present invention.
Figure 2:
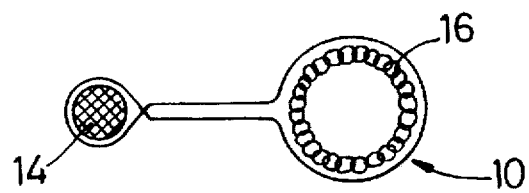
FIG. 2 is a sectional view of the gasket of FIG. 1.

With reference first to FIG. 1, wherein the presently preferred embodiment of the invention is shown, a thermal gasket, generally indicated at 8, comprises a jacket 10 of interbraided first and second yarns 11 and 12 of a thermally insulating mineral material, such as glass fiber, ceramic material or the like. Preferably, the yarns employed are each comprised of continuous filament E glass 37½ of 3608 denier per end.

As is illustrated in FIG. 1, a single warp bead or cord 14 which may be formed of substantially the same yarn as jacket 10 is laid into the braid under tension so that it is interlocked between the interlaced jacket yarns 11 and 12 in a zone extending lengthwise of the jacket. Although various beads or cords may be employed, the cord should be of a relatively temperature-resistant material and satisfactory results have been obtained using a braided bead of glass fiber yarn of a diameter of approximately ⅛ inch. The bead should be incompressible (i.e., firm enough to hold the finished gasket in place), non-stretchable and inelastic and large enough so that it can be conveniently retained in place by simple clamping means conventionally used for the purpose.

Gaskets formed according to the present invention include one or more co-axially formed metal mesh bulbs 16. As is known in the art, a metal mesh bulb 16 is preferably and typically formed of stainless steel wire having a diameter of about 0.006 inches formed as a tubular knit by presently available tubular-type knitting machines. For use in a residential cooking oven, the bulb should have a diameter of about ½0 inch. By virtue of the knitted structure, a flexible and resilient core is provided which is resistant to the effects of high temperature operation, compresses when placed between interfacing surfaces and possesses resilience to maintain an effective seal over a prolonged period of time.

Figure 3:
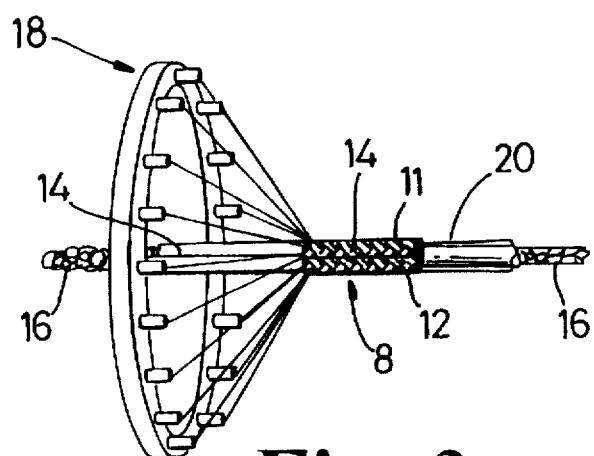
FIG. 3 is a diagrammatic view illustrating the steps of the method of making the gasket illustrated in FIG. 1.

In manufacture of the product of FIG. 1 and with reference to FIG. 3, the jacket is braided on a conventional braiding machine 18 of the maypole type. In the illustrative embodiment, a braiding machine is provided with 64 carriers. The warp bead 14 is laid in from a single guide which is fixedly mounted relative to the track so that it is interbraided between the first and second yarns in a continuous zone extending lengthwise of the product.

In forming the jacket, the first and second yarns are relatively interbraided on a hollow mandrel 20 of diameter larger than the pull-down diameter of the braid and the warp bead 14 is laid in at the point of braiding on the mandrel. No warp beads are laid in at the side of the jacket opposite to the warp bead 14. Due to the relatively large mandrel, the jacket is relatively axially compressed and radially expanded and, by adjustment of the tension of the first and second yarns, is locked in the relatively axially compacted condition along the length of the warp bead. The wire mesh bulb 16 is fed through the hollow mandrel and encapsulated within the braid as the braid comes off the mandrel. In manufacture of the jacket and bulb, the two should be relatively dimensioned so that sufficient space remains between the jacket and the bulb to allow the appropriate separation between the bulb and the bead, as will be seen below. This can be readily accomplished by the selection of a relatively large mandrel.

Figure 4:
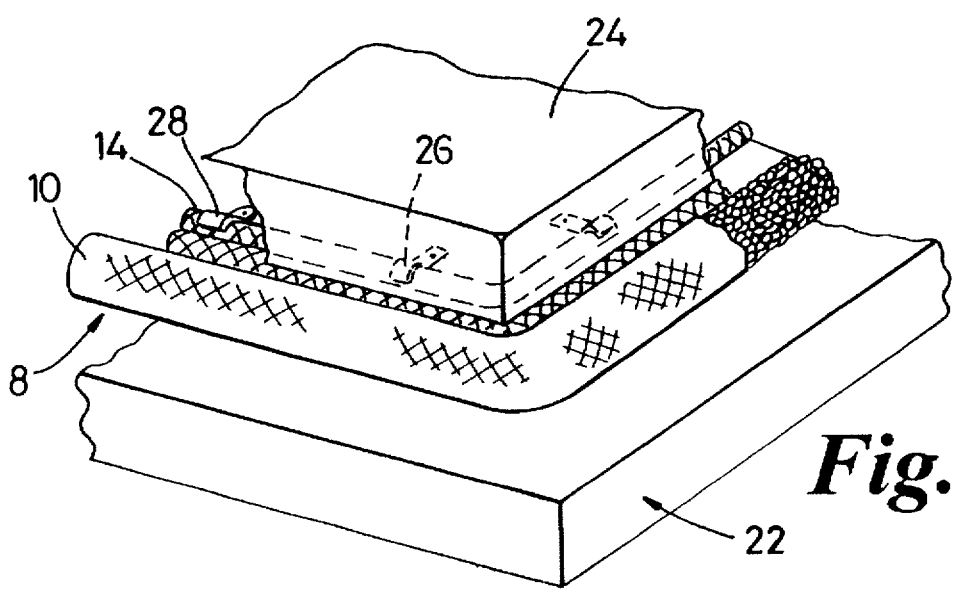
FIG. 4 is a fragment of an oven door illustrating the installation of the gasket.

FIG. 4 shows a section of a typical gasket formed according to the invention as installed on a door 22. As shown in FIG. 4, the gasket and warp bead are disposed on a door surface 24 and held in place by suitable clamps 26 which are screwed or otherwise fastened to the interior surface of the door and protected by a cover plate 28. When the gasket fits around a corner or around an irregularity in the surface being sealed, the arrangement allows for axial expansion of the jacket on the side of the jacket away from the warp bead 14 without crimping or wrinkling. Since the warp bead is interlocked into the jacket, the need for stitching to maintain it in its position separated from the bulb is eliminated, thus eliminating a major processing step and a principal cause of scrappage of defective gaskets.

I claim:

1. A stitchless tubular gasket comprising:

a tubular jacket of crossing glass fiber yarns, said tubular jacket including a sealing member with an integral, parallel, tubular side mounting member protruding along a side thereof in a zone extending lengthwise thereof;

said mounting member consisting essentially of an axially relatively non-stretchable warp bead of a diameter which is large relatively to said crossing yarns, said warp bead being laid-in between said crossing yarns within said mounting member and being effective to restrain relative movement of crossing yarns of said braided glass fiber tubular jacket contiguous to said warp bead, the crossing yarns of said braided glass fiber tubular jacket being relatively free from restraints against relative movement outside of said zone.

2. A construction according to claim 1 in which said braided glass fiber tubular member is relatively axially compressed and radially expanded.

3. A construction according to claim 2, further including a resilient, knitted wire bulb fitted within said jacket, said jacket being sufficiently large relative to said bulb to allow a zone of separation between said bulb and said warp bead with the opposed surfaces of the jacket in said zone of separation being unstitched and being in contact with each other.

4. A tubular gasket for use in sealing a space between closely adjacent relatively movable surfaces comprising:

a tubular braid of crossing glass fiber yarns;

a resilient wire support member fitted within said tubular braid and extending lengthwise thereof;

a relatively non-stretchable laid-in warp bead inserted between said crossing glass fiber yarns, said warp bead having a diameter which is large in relation to said glass fiber yarns and extending substantially the length of said tubular braid;

said crossing glass fiber yarns being relatively oriented in a position in which said tubular braid is axially compressed and radially expanded; and said relatively non-stretchable warp bead acting to restrain relative movement of contiguous crossing glass fiber yarns from said position while allowing unrestrained relative movement of said crossing glass fiber yarns which are not contiguous.

5. An insulating gasket according to claim 4, wherein said resilient wire support member is tubular, said braid being dimensioned relatively to said support member and said warp bead to provide a zone of separation therebetween the braid having side walls which are in contact with each other within said zone of separation.

6. A method of making a braided tubular gasket comprising:

braiding a tubular jacket comprised of first and second yarns onto a hollow mandrel having a predetermined diameter greater than the pull-down diameter of the jacket;

laying-in between said first and second yarns a substantially inelastic, non-stretchable warp bead of diameter substantially greater than the first and second yarns, wherein the braiding step further comprises maintaining tension on the yarns during braiding, said inelastic relatively non-stretchable warp bead acting to restrain relative movement of contiguous crossing glass fiber yarns while permitting crossing yarns not contiguous to said warp bead freedom for relative movement.

7. A method of making a braided tubular gasket according to claim 6, further comprising feeding an elongated wire mesh spacer through said hollow mandrel into the tubular jacket.

8. A method of making a braided tubular gasket according to claim 7, wherein the predetermined diameter is selected to form a first jacket portion dimensioned to surround said spacer, a second jacket portion interlocked with said warp bead and a third jacket portion separating the first and second portions, wherein the third jacket portion is comprises of a pair of wall portions extending into facing contact with each other between said first and second jacket portions.

* * * * *